UNITED STATES PATENT OFFICE.

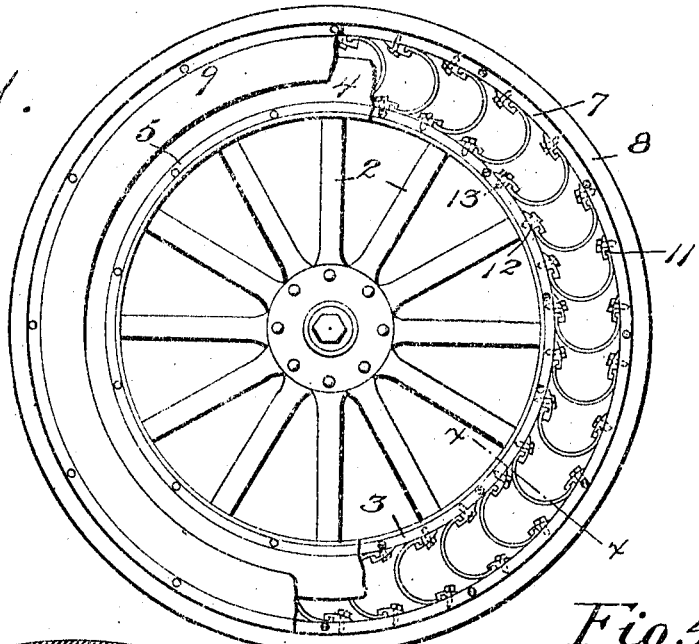
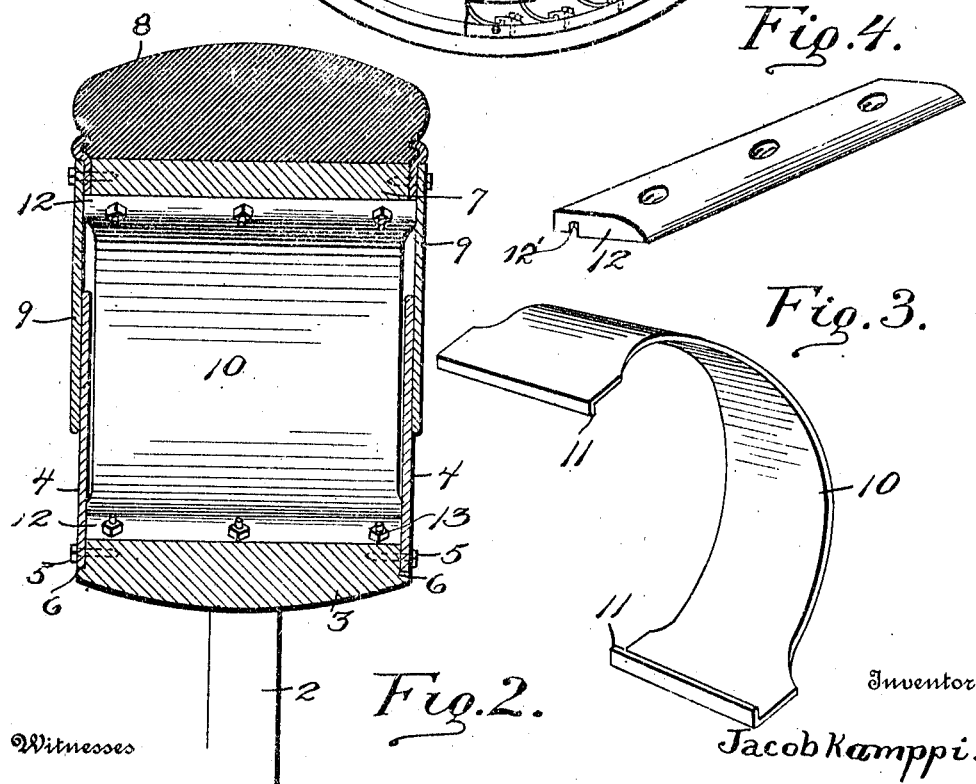

JACOB KAMPPI, OF ELSIE, OREGON.

SPRING-WHEEL.

1,035,446.

Specification of Letters Patent. Patented Aug. 13, 1912.

Application filed November 30, 1910. Serial No. 594,969.

*To all whom it may concern:*

Be it known that I, JACOB KAMPPI, a citizen of the United States, residing at Elsie, in the county of Clatsop and State of Oregon, have invented certain new and useful Improvements in Spring-Wheels; and I do hereby declare the following to be a full, clear, and exact description of the invention, such as will enable others skilled in the art to which it appertains to make and use the same.

This invention relates to improvements in spring wheels, and is adapted to use on any road vehicle, but in particular to motor cars.

The device does away with the pneumatic tire, and uses only a small, solid rubber tire to provide sufficient friction at the point of contact with the road. The springs used are of the best spring steel, and are easily inserted or removed if necessary. When assembled the wheel is neat in appearance, and no heavier than the ordinary wheel with the pneumatic tire.

The purpose of the invention is to provide a resilient, puncture-proof and durable wheel. The particular construction of the springs and the way in which they are retained give the wheel a resiliency equal to the pneumatic, and it is evidently immune to punctures and blow-outs.

With the above and other objects in view, this invention resides in the novel features of construction, formations, combinations and arrangements of parts to be hereinafter more fully described, claimed and illustrated in the accompanying drawing, in which—

Figure 1 is a fragmentary side view of the device: Fig. 2 is a transverse section on line *x—x* of Fig. 1; Fig. 3 is a detail perspective view of spring; and Fig. 4 is a detail perspective view of the clip.

Referring to the drawing by characters of reference, the numeral 1 represents the hub of a wheel, from which radiate the spokes 2, the outer ends of said spokes being fastened to the felly of the wheel 3. On each side of the felly are fastened the circular plates 4, by means of the bolts 5, shoulders 6 being formed on the felly to aid in holding the said plates in proper position. An outer ring 7 is provided, having a greater diameter than the felly 3, said ring being grooved on its outer face for the reception of a solid rubber tire 8, and having circular plates 9 fastened to its sides in the same manner as the plates 4 are fastened to the felly 3. The plates 9 are of greater central diameter than the plates 4, and are so fastened as to overlap the outer faces of the plates 4, thus providing a bearing surface to prevent lateral displacement of the outer ring and tire, as well as to prevent the entrance of dirt and stones into the spring retaining chamber.

A large number of substantially U-shaped leaf springs 10 are interposed between the felly 3 and the ring 7, to furnish the proper resiliency to the wheel. The ends of the springs are provided with inwardly extending lips 11, which are adapted to fit within L-shaped recesses 12' formed on the under side of and adjacent to the front end of the transverse clips 12, which are in turn firmly held in position on the inner surfaces of the outer and inner rings by the bolts 13, thus securely holding the springs in their proper position, as clearly illustrated in the drawing. The springs 10 have their edges slightly cut away through the central portion to allow clearance for the plates 4 and prevent friction between said parts.

Having thus fully described my invention, what I claim as new and desire to secure by Letters Patent is:

In a spring wheel, a hub, a rim connected to said hub by means of spokes, an outer rim spaced from said first mentioned rim, U-shaped leaf springs connecting said rims, inwardly and outwardly extending lips on the opposite ends of said springs respectively, plates bolted to said rims, the said plates having formed on the under side and adjacent the front end thereof L-shaped recesses for the reception of said lips, substantially as described.

In testimony whereof I affix my signature in presence of two witnesses.

JACOB KAMPPI.

Witnesses:
 CHAS. GRONNEL,
 STEPHEN ABRAHAMSON.